Dec. 12, 1961   W. B. SCHOTT   3,012,344
MACHINE FOR ASSEMBLING FASTENER UNITS
Filed Sept. 10, 1958   10 Sheets-Sheet 1

INVENTOR.
Warren B. Schott
BY
Kenway, Jenney, Witter & Hildreth
Att'ys.

Dec. 12, 1961  W. B. SCHOTT  3,012,344
MACHINE FOR ASSEMBLING FASTENER UNITS
Filed Sept. 10, 1958  10 Sheets-Sheet 4

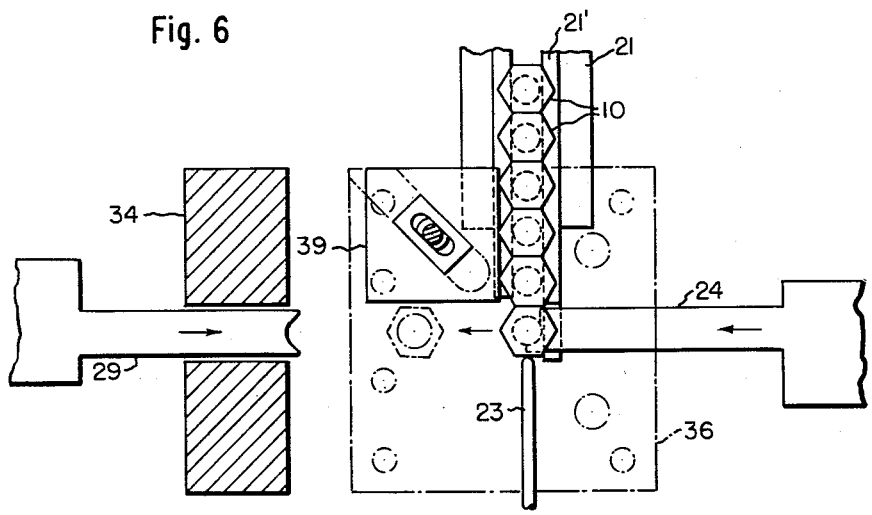
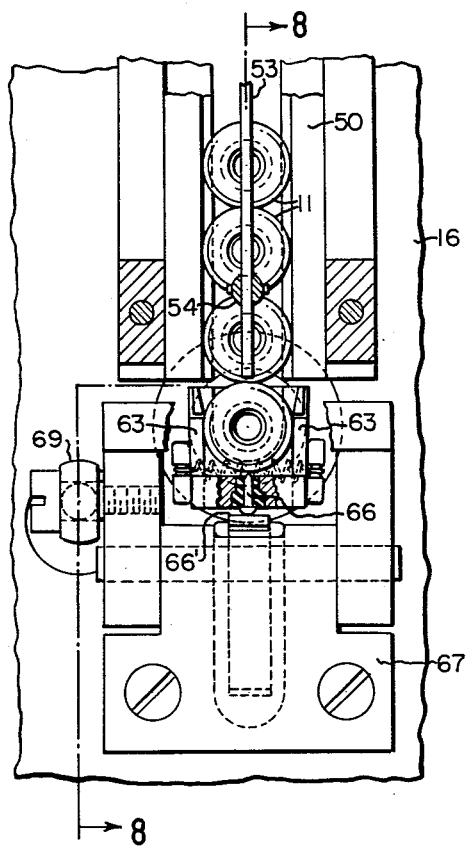
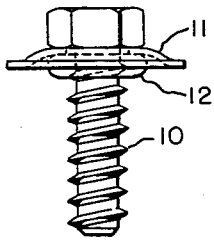
Fig. 6
Fig. 7
Fig. 6A

Dec. 12, 1961  W. B. SCHOTT  3,012,344
MACHINE FOR ASSEMBLING FASTENER UNITS
Filed Sept. 10, 1958  10 Sheets-Sheet 7

INVENTOR.
Warren B. Schott
BY
Kenway, Jenney, Witter & Hildreth
Attys

Dec. 12, 1961  W. B. SCHOTT  3,012,344
MACHINE FOR ASSEMBLING FASTENER UNITS
Filed Sept. 10, 1958  10 Sheets-Sheet 8
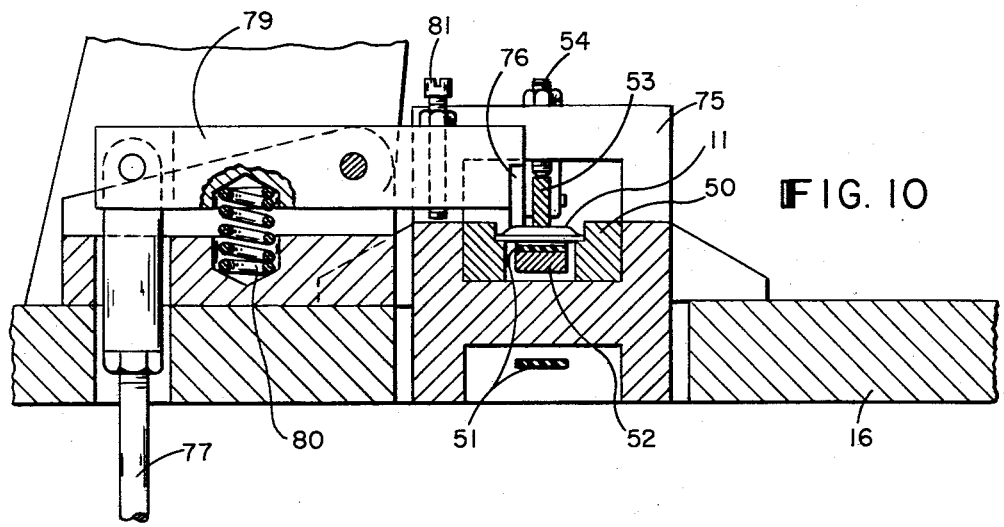
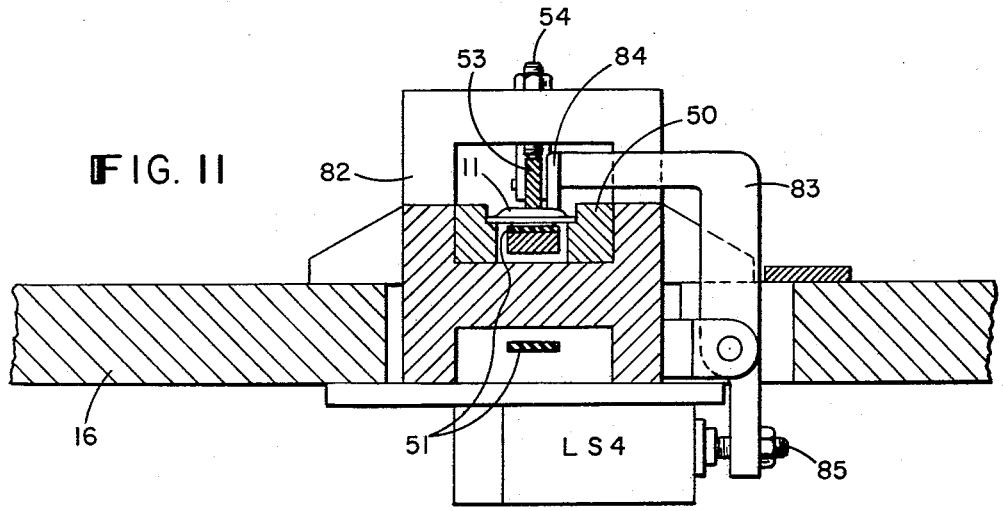
INVENTOR.
Warren B. Schott
BY
ATTORNEY.

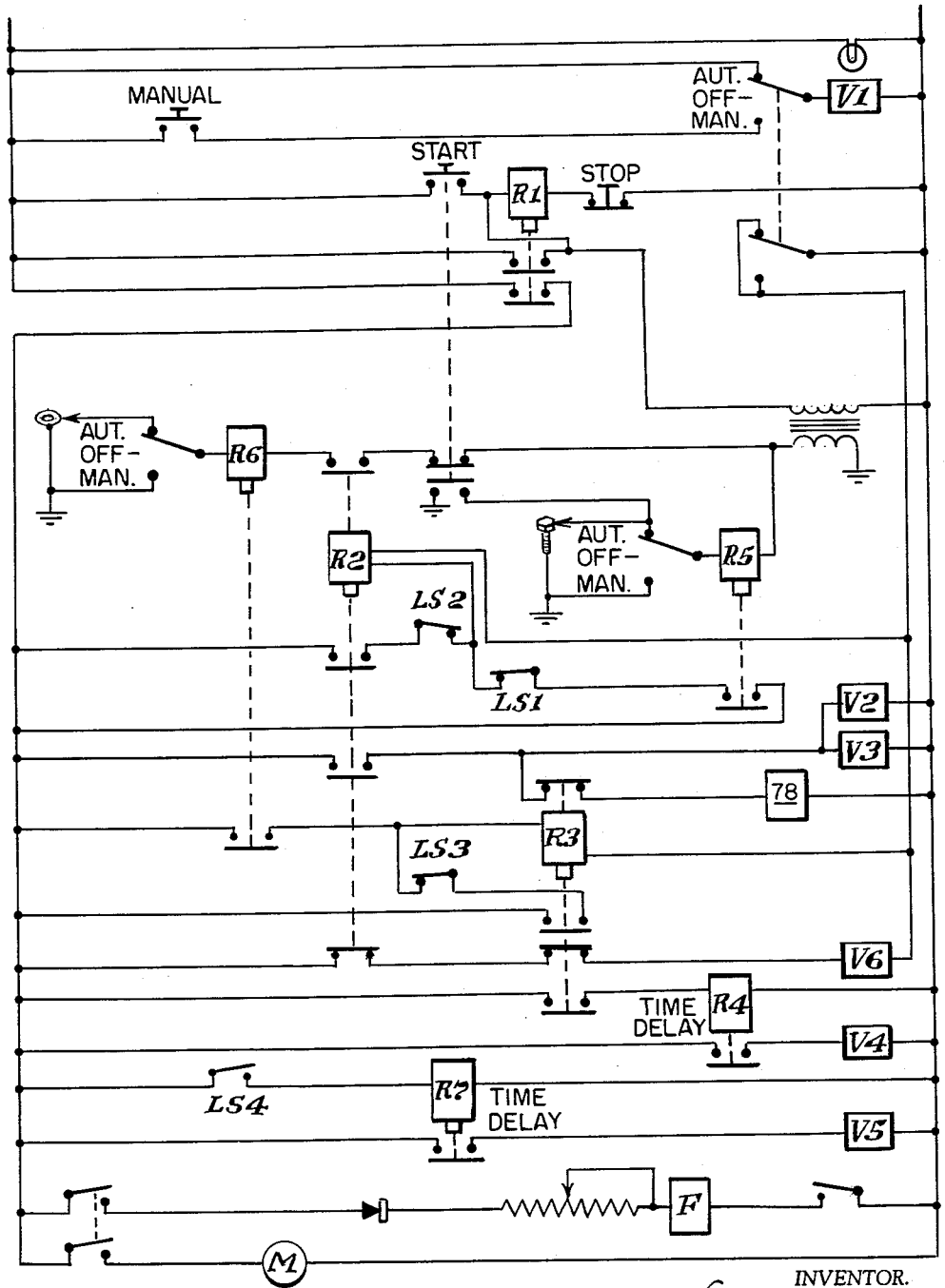

3,012,344
MACHINE FOR ASSEMBLING FASTENER UNITS
Warren B. Schott, Topsfield, Mass., assignor to L. J. Barwood Manufacturing Co., Inc., Everett, Mass., a corporation of Massachusetts
Filed Sept. 10, 1958, Ser. No. 760,204
9 Claims. (Cl. 10—155)

This invention comprises a new and improved machine for automatically assembling fastener units, particularly units that include a composite washer having a plastic sealing ring and a threaded screw or bolt.

Heretofore considerable difficulty has been encountered in assembling a washer of that character with a threaded component without damage to the sealing ring since in its most advantageous position the ring must slightly overlap the inner circumference of the washer. Under these conditions the thread of the screw or bolt is likely to damage or dislodge the sealing ring or portions thereof. Either of these mischances results in a defective fastener, that is, one which will not produce a watertight joint when used.

In the machine of the present invention means is provided for suspending the screw or bolt in a fixed vertical position and then threading the composite washer on each screw by upward movement. It has been found that the accuracy of the assembling operation is such under these conditions that no damage is done to the sealing ring and that the washer is always seated firmly against the under face of the screw or bolt head.

The present invention comprises a number of novel mechanisms which have been found very advantageous and important in bringing about accurate and reliable performance of the machine at high speed. This is essential from a commercial standpoint as the cost of assembling the components otherwise becomes prohibitive.

The principal features comprised in the present invention may be enumerated as follows:

(1) Improved washer raceway with underlying belt feed and overhead guide rail;

(2) A stop pin for determining the position of the bolt or screw at the raceway end having the additional function of an electrical contact member for indicating failure of a screw at a critical point;

(3) Screw transferring mechanism between the raceway and assembling position including a spring pressed hold-down plate and other elements for engaging the screw heads to stabilize their position;

(4) An electrically operated clamp to stop progression of the washer feed in order to synchronize it with the rate of assembly;

(5) The provision of an intermittently operated air blast for ejecting the assembled fasteners;

(6) The provision of compressed air blast for removing excess washers from the raceway of the supply magazine;

(7) Mechanically operated transfer plungers for moving the screws one by one from the raceway to assembling position;

(8) A screw raceway adjustable to take care of screws having heads of different thickness and overall dimensions;

(9) A washer keeper to hold each washer in place as it comes from the raceway to the plunger;

(10) Adjustable delivery end for the screw raceway;

(11) Novel arrangement of electric and manual controls for the machine.

These and other features of the invention will be best understood and appreciated from the following description of a preferred embodiment thereof selected for purposes of illustration and shown in the accompanying drawings in which.

Figure 1:
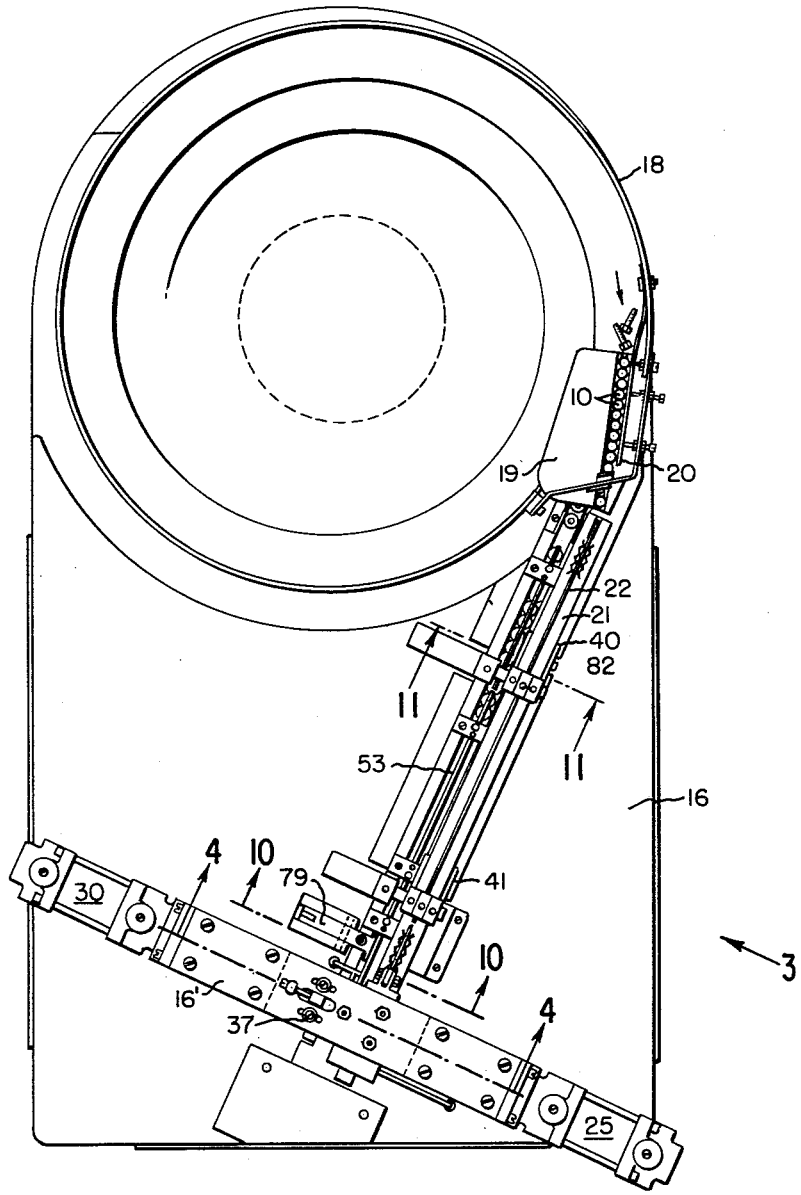
FIG. 1 is a plan view of the machine on a reduced scale.
Figure 2:
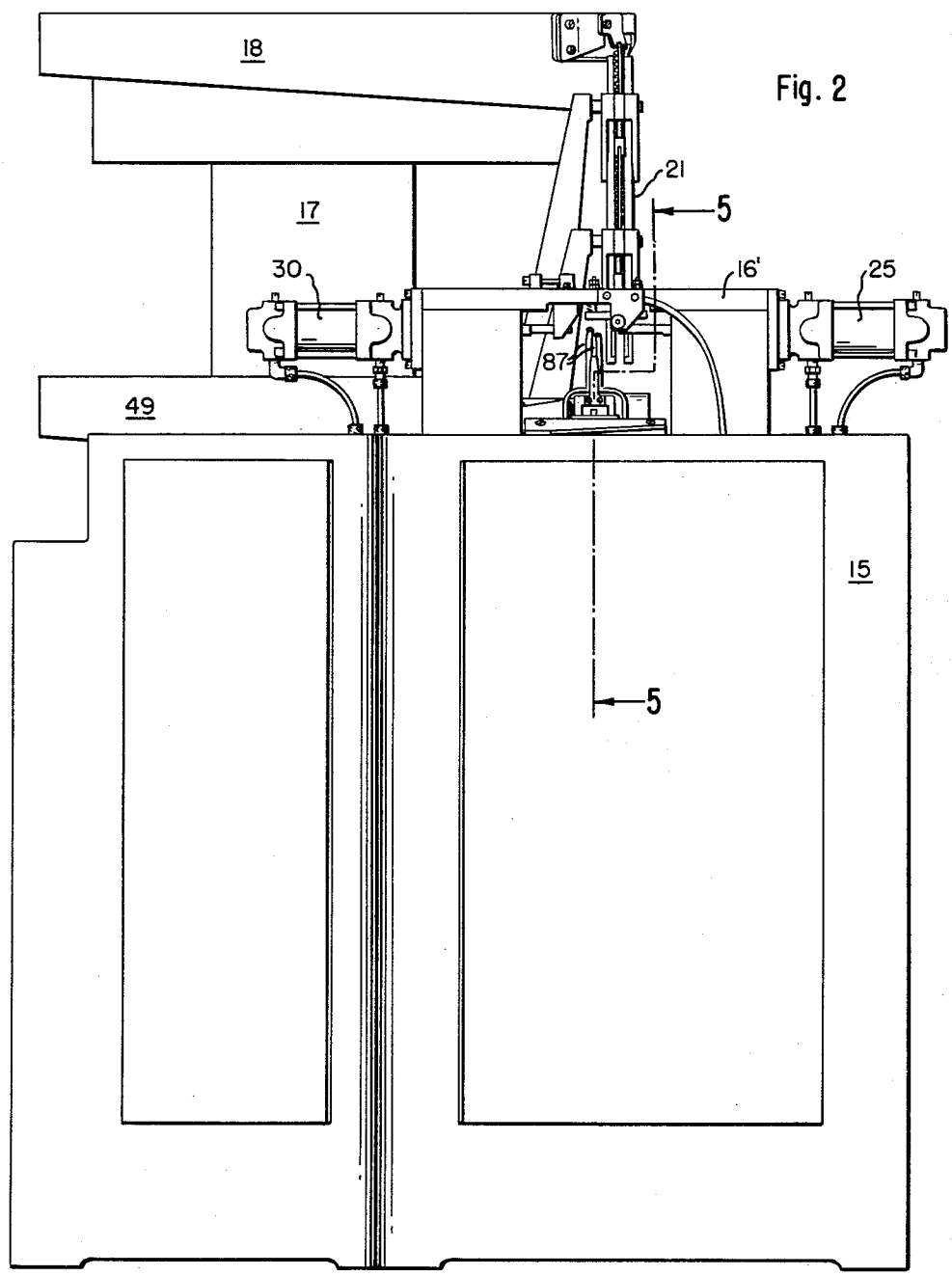
FIGS. 2 and 3 are corresponding views in front and side elevation.
Figure 4:
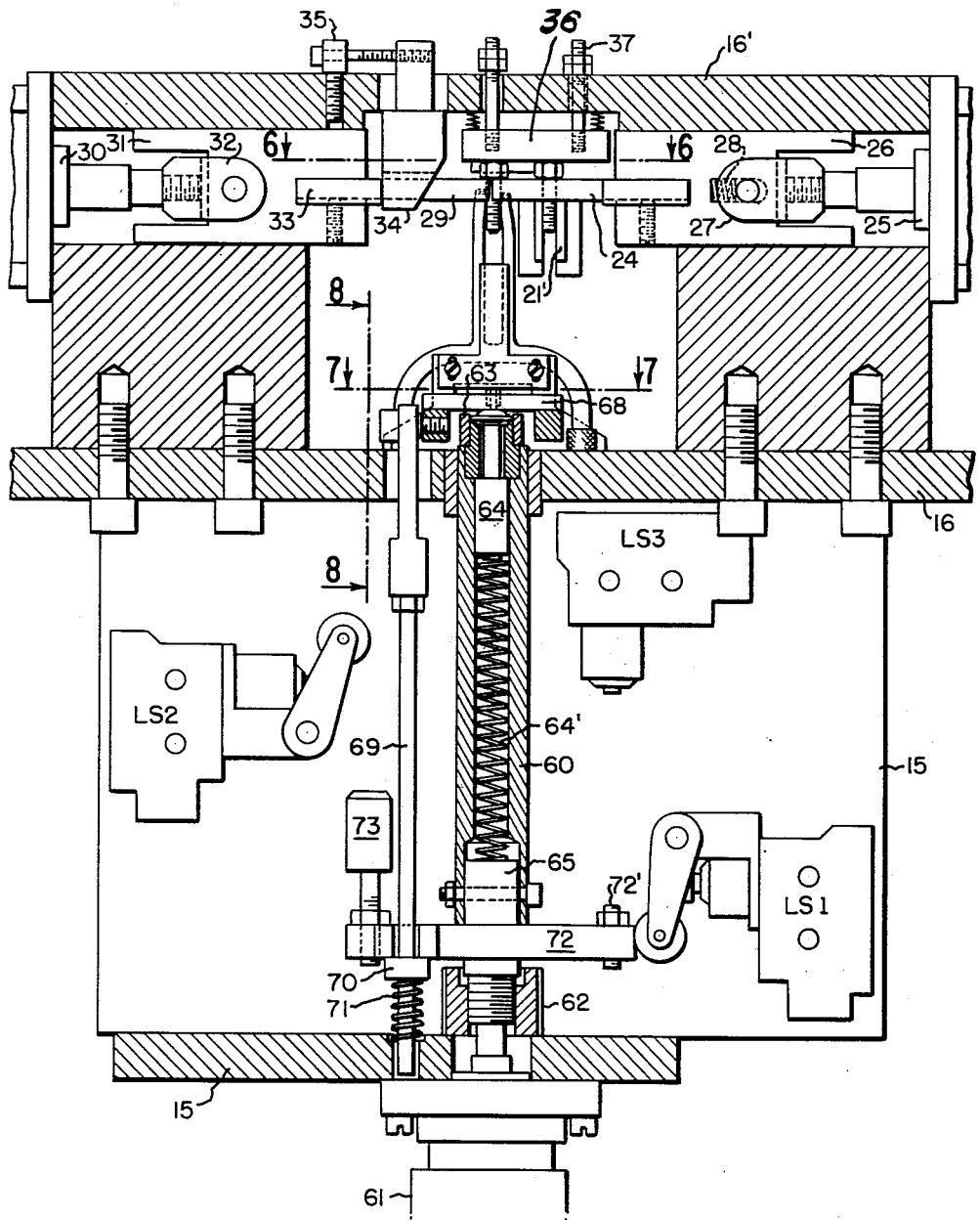
Figure 5:
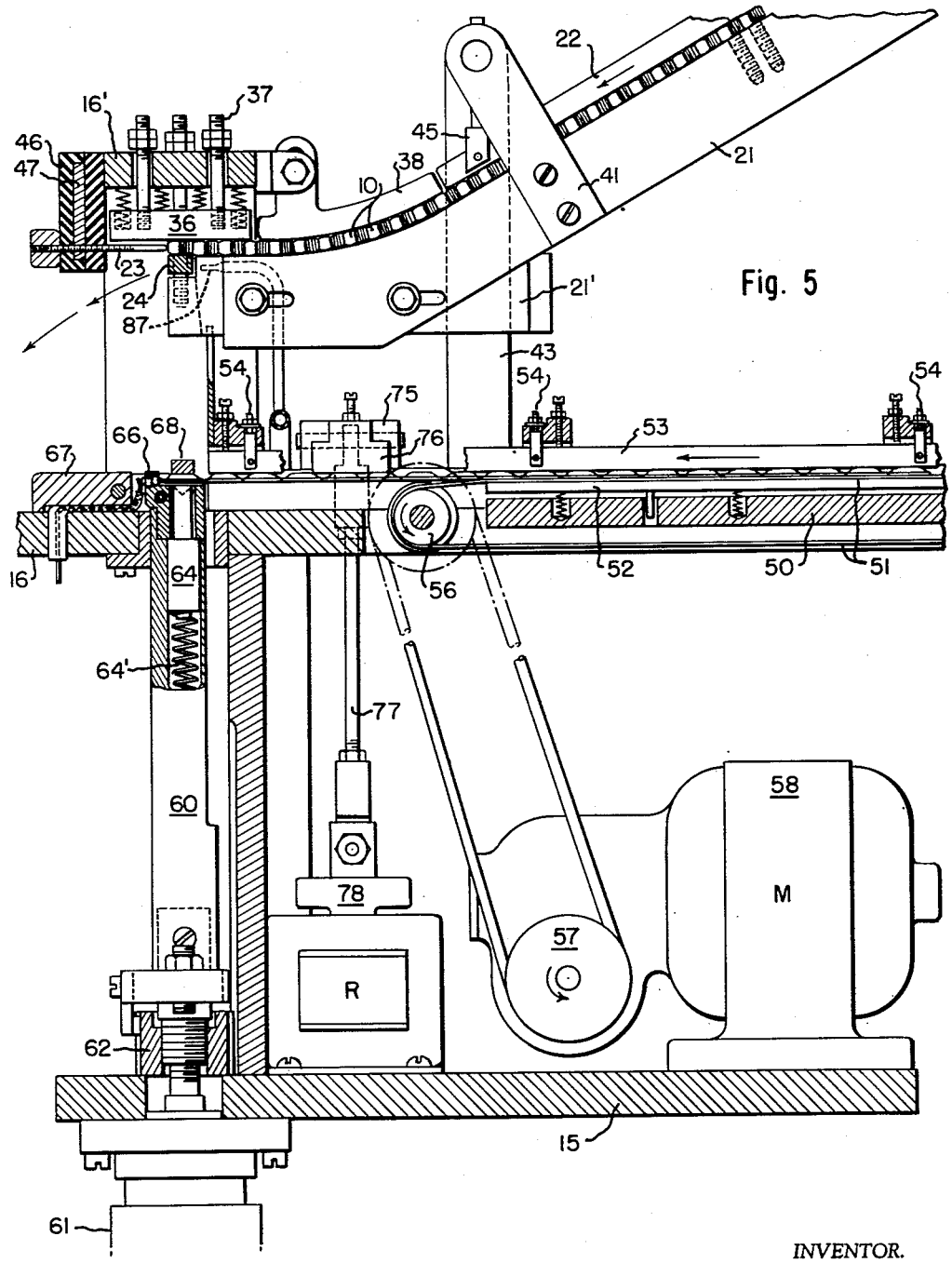
Figure 8:
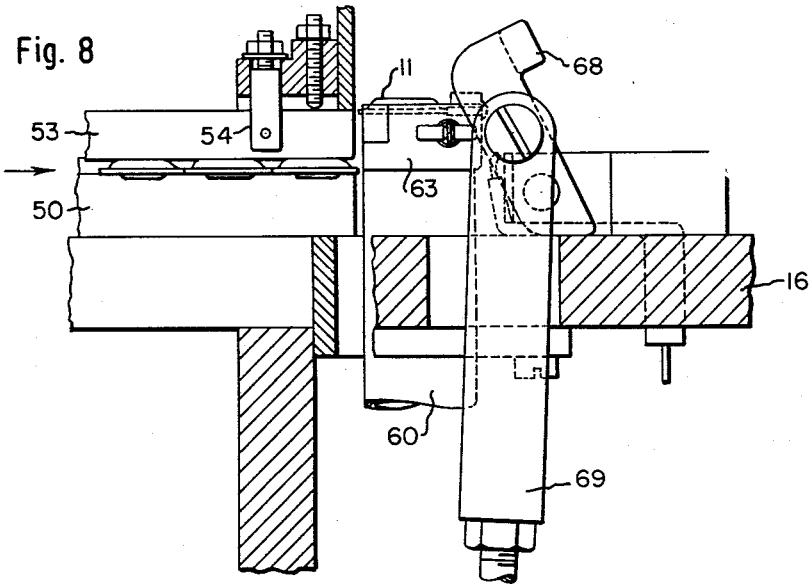
Figure 9:
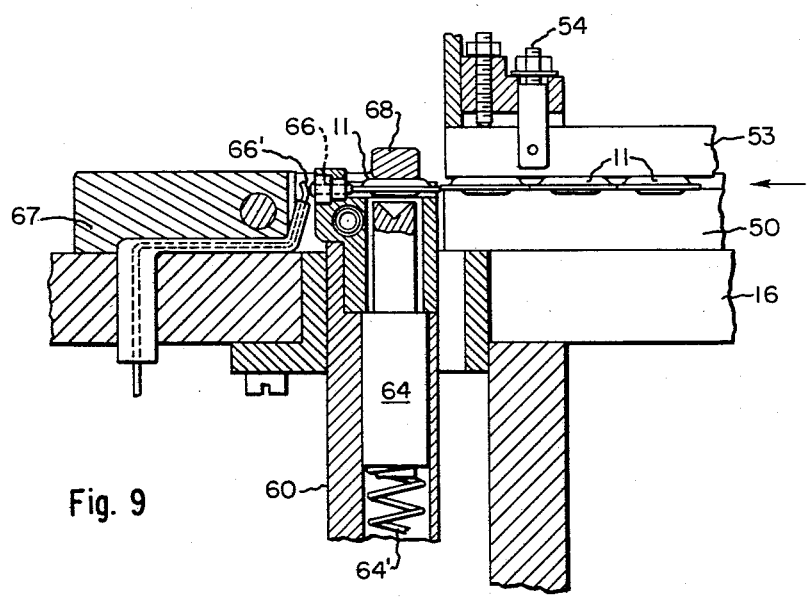
Figure 12:
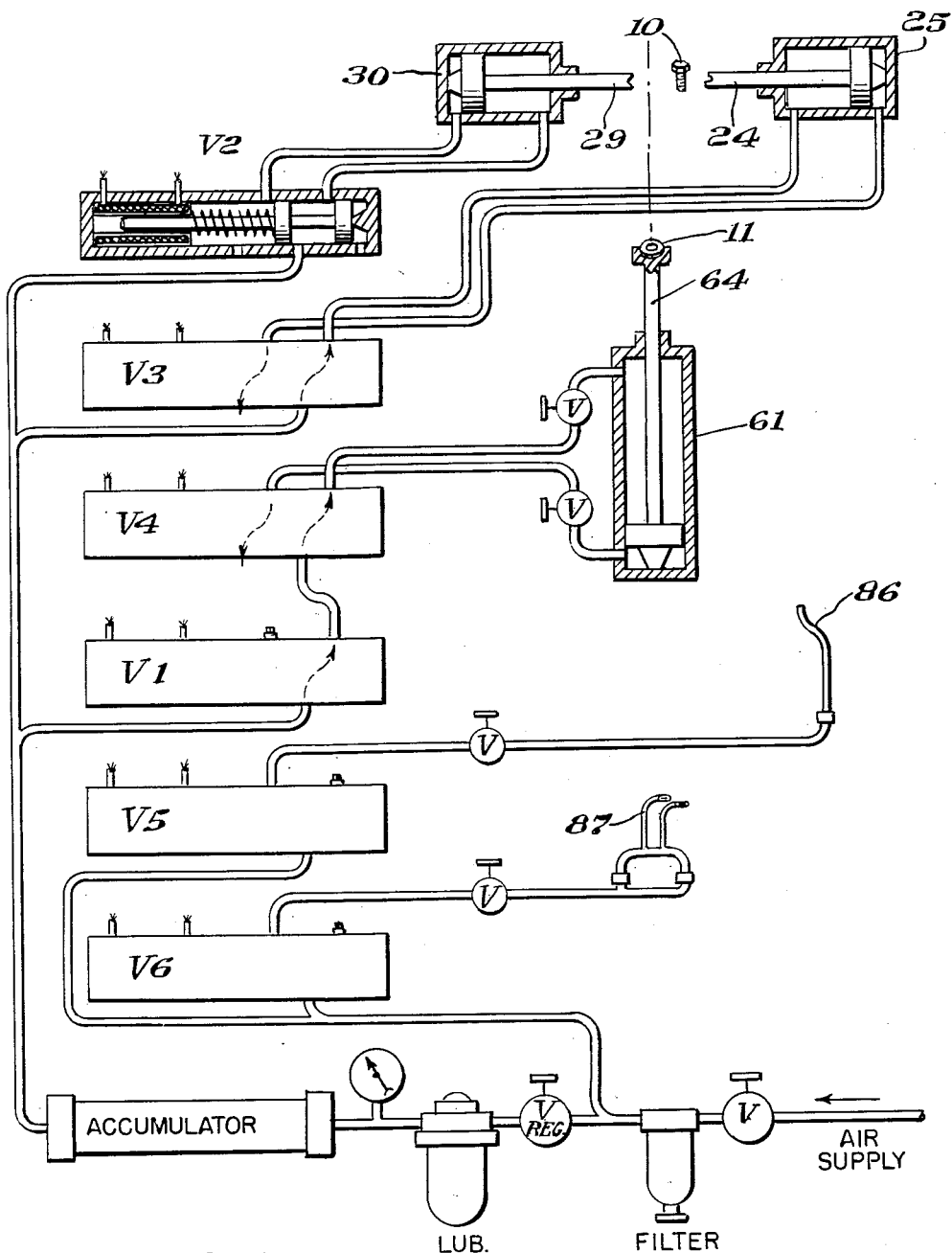

FIG. 4 is a view in vertical section on the line 4—4 of FIG. 1 but on an enlarged scale, FIG. 5 is a view in vertical section on the line 5—5 of FIG. 2, FIG. 6 is a sectional plan view on the line 6—6 of FIG. 4, FIG. 6a is a view in elevation of the assembled fastener unit, FIG. 7 is a sectional plan view on the line 7—7 of FIG. 4, FIG. 8 is a view in vertical section on the line 8—8 of FIG. 7, FIG. 9 is a fragmentary view of FIG. 5 on an enlarged scale, FIG. 10 is a sectional view in elevation on the line 10—10 of FIG. 1, FIG. 11 is a sectional view in elevation on the line 11—11 of FIG. 1, FIG. 12 is a diagram showing the compressed air connections of the machine, and FIG. 13 is a diagram of the electrical connections.

The fastener unit herein shown as the assembled product of the machine to be described is depicted in FIG. 6a and comprises a threaded screw or bolt 10 upon the shank of which is threaded a metal washer 11 partially dome shape and having a sealing ring 12 of flexible elastomeric compound secured to its under face concentrically with respect to the hole of the washer and slightly overlapping its inner edge.

The main frame 15 of the machine is suitably encased and includes a horizontal table 16 and a platform 16' upon which the various elements of the machine are suitably mounted. From the top of the machine extends a post 17 carrying at its upper end a magazine 18 for screws leading to a raceway 21. Beneath this magazine is mounted a second magazine 49 for the composite washers and this leads to a substantially horizontal raceway 50. Both magazines are of the Syntron type and are adapted to contain an ample supply of the respective components. The magazines are subjected to a high frequency vibration which causes the parts to be assorted and delivered in the proper position to the communicating raceways. These magazines are commercial articles available in the open market and in themselves constitute no part of the present invention.

Figure 3:
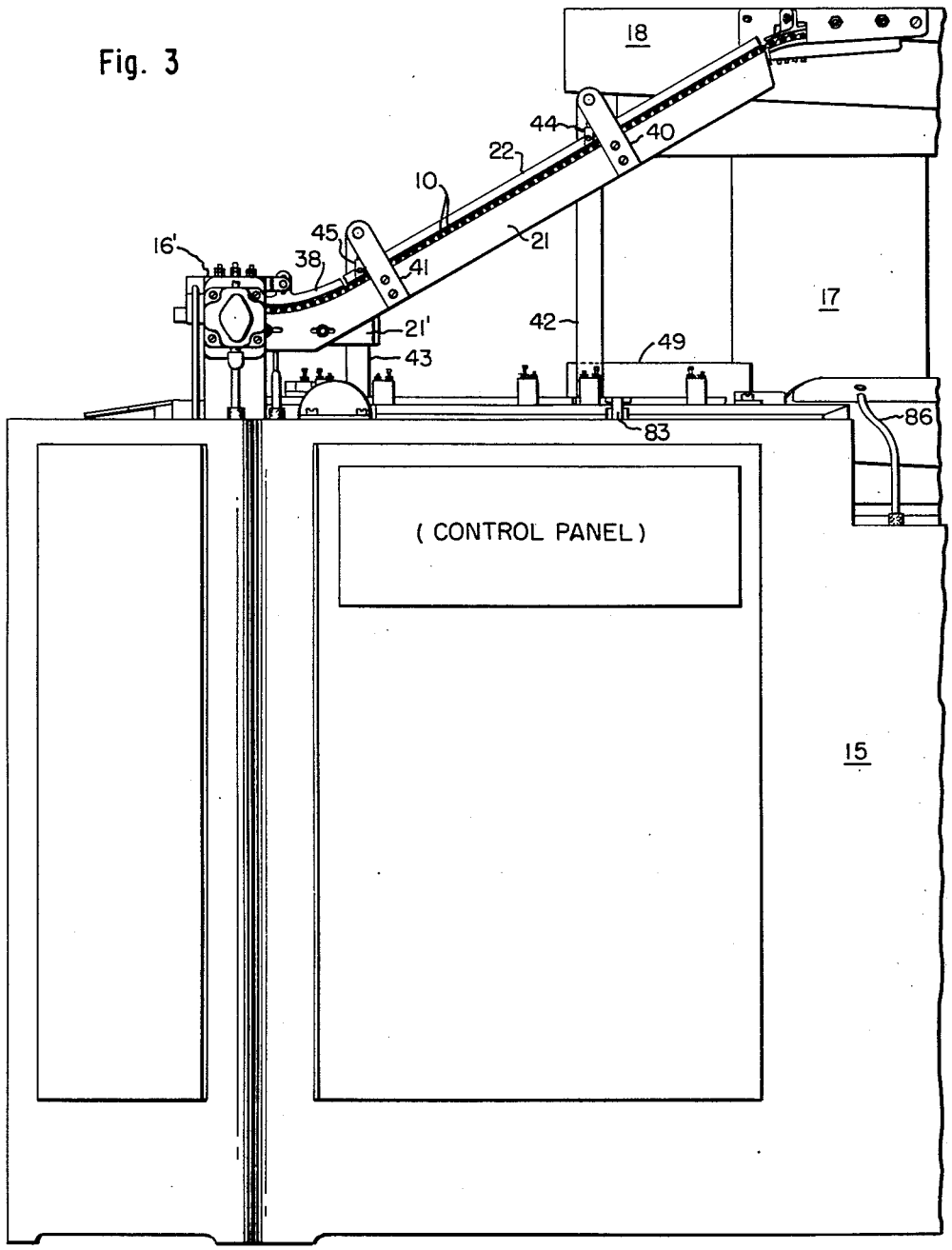

As shown in FIGS. 1 and 3 the outlet of the screw magazine 18 is formed by two flanged plates 19 and a spring blade 20 which is adjustably maintained at the proper spacing from the flange of the plate 19 to accommodate the dimensions of the heads of the screws being dealt with. The outlet port thus formed leads directly to the inclined raceway 21 down which the screws pass by gravity while suspended by their heads. A top retaining rail 22 is provided throughout the major portion of the raceway and this is supplemented by an adjustable hold-down segment 38 so that the position of the screws in the raceway is accurately controlled without danger of jamming. The endmost screw in the raceway is arrested positively by a stop pin 23 which also serves as an electrical contact in a circuit energized to indicate the presence or absence of a screw at the delivery end of the raceway as shown in FIG. 5. The raceway includes an extension section 21' adjustably secured in place to determine accurately the position of the screw for transfer into its fixed position for assembly with the washer.

The transfer of the endmost screw from the raceway 21 to assembling position, as best shown in FIG. 6, is effected by a pair of opposed transversely movable plungers of which the right hand plunger 24 is operated by compressed air cylinder 25 and travels in a notch at the end of the raceway extension 21'. The plunger 24 is connected to its operating cylinder through a sliding block 26 and a clevis 27 which is connected to the piston of the cylinder 25. A spring 28 is interposed in the connection so that the plunger 24 arrives yieldingly at its final position, this being determined by the final position of the left hand plunger 29 which is operated from a compressed air cylinder 30 through a sliding block 31 and clevis 32.

The final position of the plunger 29 is determined by a stop plate 33 secured in the block 31 in position positively to engage an adjustable stop block 34 carried by a stud 35 which projects upwardly from a platform 16' supported in position above the table 16. It will be seen, therefore, that the endmost screw is picked out of the raceway extension 21' by the action of the right hand plunger 24 which then cooperates with the left hand plunger 29 in determining accurately the transverse position of the screw for the assembling operation. In passing to this position the head of the screw is engaged by a spring-pressed hold-down plate 36 which is yieldingly suspended beneath the platform 16' by screws 37. Beneath the hold-down plate 36 is provided a keeper plate 39 shown in FIG. 6 as arranged to bear against the left side of the three endmost screws in the raceway and control their position in reaching the delivery point. The keeper plate has an upwardly extending key-way which slides on the underside of the hold-down plate 36. The key-way is slotted to receive a clamping screw by which the plate may be held in the desired adjusted position.

The hold-down segment 38 of the raceway already mentioned is adjustably mounted between ears projecting rearwardly from the platform 16'. The retaining rail 22 is adjustably supported in contact with the heads of the screws in the raceway 21 and for this purpose arms 40 and 41 are secured to the sides of the raceway and connected to the upper ends of upright standards 42 and 43 which rise from the table 16. The standard 42 and the arm 40 are connected at their upper ends by a transverse pin from which depends an adjustable link 44 connected to the rail 22. Similarly, the standard 43 and the arm 41 are connected to support an adjustable pendant rail-carrying link 45.

The contact stop pin 23 is mounted in a block 46 of insulating material which contains a metal plate 47 constituting part of an electric circuit including solenoids R5 which are energized to open the valves V2 and V3 admitting compressed air to the cylinders 25 and 30 for advancing the plungers 24 and 29 when contact with the pin 27 indicates that a screw has reached the delivery end of the raceway 21.

The washers 11 and 12 which are generally flat in shape and light in structure are ordinarily difficult to handle automatically but the mechanism now to be described has been found entirely satisfactory for its intended purpose.

The washers are assorted and delivered in the proper position by the operation of the Syntron magazine 49 to a horizontal raceway 50 comprising rails which as shown in FIGS. 10 and 11 are spaced so as to support the washers by their rims leaving the sealing ring 12 suspended in space between them.

In order to advance the washers along the raceway there is provided a continuously running feed belt 51 disposed between the rails of the raceway and pressed upwardly against the washers by an underlying spring supported presser plate or bar 52, also freely movable between the rails of the raceway. A hold-down rail 53 is mounted above the raceway 50 in position to resist the upward thrust of the feed belt and this rail is adjustably mounted by threaded supporting arms 54 depending from brackets spaced along the raceway. The raceway 50 leads directly to a pickup point in line with and below the screw which has been transferred to the point of assembly.

The feed belt 51 runs over pulleys 56 journalled in the table 16. One of these as shown in FIG. 5 is driven continuously by a motor 58 through belt connections. The motor has its own energizing circuit and starting and stopping switch. The feed belt 51 frictionally engages the washers in the space between the rails 50 of the raceway and advances them to a vertically movable carrier member, viz. the plunger 60 which is reciprocated by connection at its lower end with a compressed air cylinder 61. The plunger 60 is threaded at its lower end and carries an adjustable stop sleeve 62 arranged to engage the table 15 and so positively determine the initial and washer-receiving position of the plunger.

At its upper end the plunger 60 has a washer-receiving seat and this is formed in part by a pair of side arms 63 pivotally mounted on the plunger, connected by a tension spring and flaring slightly to receive the on-coming washer from the end of the raceway 50—50. The plunger contains an ejector pin 64 which is cupped at its upper end to receive the end of the screw and retain it instantaneously in place after the washer has been threaded thereon. The pin 64 is backed up by a long compression spring 64' which rests on a plug 65 at the bottom of the plunger 60.

At the outer side of the washer seat is located an electrical contact pin 66 which is carried by the plunger in position to be engaged by a washer when delivered from the raceway to the washer seat of the plunger when the plunger 60 makes contact with the stationary terminal 66' of a circuit which includes a lead wire clamped by the block 67 to the table 16 as shown in FIG. 9. In this circuit is included a solenoid R6 controlled in its action by current flowing through the washer when properly delivered and acting to stop the machine upon failure of a washer to appear in place upon the plunger.

A bridge-shaped keeper 68 is pivotally mounted on the frame and arranged to swing over the upper end of the plunger and into operative position as shown in FIG. 4 for holding the washer upon its seat in the plunger 60, or inoperative position as shown in FIG. 8 where it is out of line with the washer in its upward movement toward and upon the screw which is held above it in assembling position. To one side of the keeper is pivotally attached a rod 69 having near its lower end a collar 70 engaged by a compression spring 71 seated on a part of the machine frame 15. The spring 71 tends always to lift the rod 69 and to throw the keeper 68 into its inoperative position as shown in FIG. 8. A transversely disposed plate 72 is secured to the lower end of the plunger 60 and this is perforated for the free passage of the rod 69 but arranged to engage the collar 70 and depress the rod 69, thus swinging the keeper 68 into its operative position when the plunger 60 is in washer receiving position. The keeper 68 is also included in the electric circuit with the washer and the contact pin 66 as indicated in FIG. 8.

The plate 72 also carries an adjustable cam 73 arranged to engage and close the switch LS2 at a predetermined point in the upward travel of the plunger 60. Similarly, the right hand side of the plate 72 carries an adjustable contact stud 72' which acts to close the switch LS3 at a somewhat later point in the upward travel of the plunger 60. The right hand edge of the plate 72 itself is utilized to close the switch LS1 when the plunger 60 arrives at its lower and initial position.

The raceway 50—50 has a bridge-shaped bracket 75 located approximately over the fourth washer from its delivery end as shown in FIG. 5, and in this bracket is mounted a presser foot 76 operated by a vertical rod 77 and solenoid 78 through a rocker 79 pivotally mounted adjacent to the raceway as shown in FIG. 10. The solenoid 78 acts in opposition to a compression spring 80 which tends always to swing the rocker 79 in a clockwise direction, bringing the presser foot 76 into contact with the washer beneath it and so arresting progression of the line of washers in the raceway until released by action of the solenoid which is timed by action of the switch LS1 upon arrival of the plunger 60 in its initial position. The rocker 79 carries an adjustable stop screw 81 which limits its movement in case the presser foot 76 fails to encounter a washer.

A second bridge-shaped bracket 82 bridges the washer raceway at an intermediate point as shown in FIGS. 1 and 11, and in association with this is mounted an angular sensing lever 83 carrying a presser foot 84 which is located above the line of washers, and an adjustable stop screw 85 arranged to operate a switch LS4 located under the table 16. So long as the raceway is empty the switch LS4 is open. When, however, the presser foot 84 is held in elevated position as shown in FIG. 11 the switch is closed, energizing a circuit for opening the valve V5 in a compressed air system including an air nozzle 86 located as shown in FIG. 3 and effective to return to the Syntron magazine washers which would otherwise be superfluous in the raceway.

A pair of air nozzles 87 is located immediately to the rear of the assembly position as shown in FIG. 5 and these are directed against the body of the screw. Air from these nozzles is controlled by valves V6 which are opened by action of the switch LS3 as the plunger 60 is in its final position so that the instant the screw is released by the ejecting pin 64 the assembled product is blown out of the machine in its complete condition.

The electrical system of the machine may be utilized as follows. Assuming that all unmarked switches are closed and the others in automatic position, the plungers 24 and 29 in retracted position and the carrier plunger 60 is somewhere on the down stroke. The solenoids R2 and R3 are deenergized and the valve V5 is open. The switch LS1 is open and the switches LS2 and LS3 are in closed position. The manual and starting switches are now closed and the solenoid R1 energized so that it acts to close its connected switches and admit actuating current to the system. When a screw 10 is delivered and makes contact with the contact pin 23, the solenoid R5 is energized. Meanwhile the plunger 60 completes its down stroke closing switch LS1 and energizing the solenoid R2. The valves V2 and V3 thereupon operate to cause the plungers 24 and 29 to advance a screw in a horizontal path to the assembly position. Solenoid 78 is energized to release the washer hold-down 76. One branch of the circuit from the transformer shown in FIG. 13 runs to the solenoid R6. When R2 is energized it opens the switch causing valve V6 to close and the ejecting air jet from the nozzle 86 is shut off.

A washer is immediately fed to the washer seat, closing the circuit through the contact pin 66 energizing solenoid 78 which, in turn, energizes solenoid R3. The solenoid 78 releases and the presser foot 76 stops further movement of washers along the raceway 50—50. The solenoid R4 is energized to open the valve V4. A slight delay in the closing of valve R4 permits the washer clamping mechanism to complete its operation before the carrier plunger 60 starts to move. As this plunger advances it opens the switch LS2 to de-energize the solenoid R2 causing retraction of the screw-carrying plungers 24 and 29. At the top of its stroke the plunger 60 opens the switch LS3 whereby the solenoid R3 is de-energized to open passage to the ejecting air jets 87 and close valve V4 retracting the plunger 60 and blowing an assembled unit out of the machine at the instant the pin 64 disengages the end of the screw.

It will be apparent from the wiring diagram that the operation of the machine may be controlled step-by-step by operation of the switches marked "Manual," whereas automatic operation is instituted by closing the switch marked "Start." The machine may be stopped at any time by opening the switch marked "Stop." When the machine is started, solenoids R1, R2 and R5 (with a screw at the delivery point) are energized to feed a screw to the assembling position and start the washer feed band. Washers will not feed to the carrier plunger 60 unless contact has been made by a screw with the contact pin 23 and the solenoid R2 energized. The carrier plunger 60 will not advance unless contact has been made by a washer with the contact pin 67 and the solenoid R3 energized. The entire electrical system is operated from a single service circuit as indicated in FIG. 13.

The compressed air system insures an adequate supply of dry, clean, filtered air. The valves are of the well-known Beckett type and depend upon the fit of the spool-shaped valve body for sealing. The operation of the valves is very fast and dependable, and having correctly adjusted the various elements of the machine it may be depended upon for long periods of completely automatic operation without the need of any further attention than the maintenance of a proper supply of screws and washers in their respective magazines.

Having thus disclosed my invention and described in detail a preferred embodiment thereof, I claim as new and desire to secure by Letters Patent:

1. A screw and washer assembling machine comprising a screw raceway and a washer raceway, transferring elements associated with each raceway for moving a screw and a washer from their raceways to a common assembling position, and electric contact means included in circuits through a screw and a washer at their respective positions for transfer energized to actuate the said transferring elements only when both a screw and a washer have appeared in position for transfer, whereby current flowing through both the screw and washer actuates the transfer element aforesaid.

2. A screw and washer assembling machine comprising a screw raceway notched at one side in pick-up position, a transferring plunger movable transversely through the notch of the raceway to transfer a screw from the raceway to assembling position, a combined stop pin and electric contact for stopping a screw at the end of the raceway in the path of the transferring plunger, means for threading a washer on the screw in its position as determined by said transferring plunger, and an electric circuit including said stop pin and the screw arranged to be energized for carrying out the cycle of the machine except upon failure of a screw to appear in pick-up position and to serve as a part of said circuit.

3. A screw and washer assembling machine comprising means for holding a screw by its head in a fixed projecting position, and washer-presenting mechanism including a plunger movable toward the screw in axial alignment therewith and having a washer seat at its end, a bridge-like keeper pivotally mounted upon an axis at one side of the path of the plunger and arranged to swing into position spanning the washer in place thereon upon delivery to said seat, and spring-operated means for displacing the keeper controlled by movement of the plunger and operating for uncovering the washer to be threaded upon the screw.

4. A screw and washer assembling machine as described in claim 3 in which the keeper is connected to a spring-operated rod and the plunger carries a positively acting contact member for engaging and moving the rod into position for holding the keeper in washer-retaining position when the plunger is in its initial washer-receiving position remote from the screw holdng means.

5. A screw and washer assembling machine comprising a raceway for screws, a stop contact pin located opposite the end of the raceway for determining the delivery position of a screw in that position and the presence of a screw in that position, opposed plungers movable toward each other to engage the shank of a screw beneath its head and transfer it to an assembling position and then to hold the screw in fixed assembly position, an electric circuit including said stop contact pin and also the delivered screw itself for energizing a subsequent part of the circuit for initiating the movement of said plungers, and a carrier movable to present a washer to the screw in its said fixed assembly position.

6. A screw and washer assembling machine as described in claim 5, further characterized in that one of said plungers is operated yieldingly to transfer a screw toward the assembling position and the other is arrested by positive engagement with an adjustable stop that determines the assembly position of the screw.

7. A screw and washer assembling machine as described in claim 5, further characterized in that a spring pressed holddown plate is provided for engaging the top of the screw head in its transfer from the raceway to its fixed assembly position.

8. A machine of the class described comprising a screw raceway having its end open at one side and a notch in its other side, an adjustable contact member located opposite to the end of the raceway for engaging and arresting the endmost screw in registration with said notch, a yieldable overhead plate engaging the top of the screw, cooperating transversely movable plungers, one being movable through the said notch, for transferring the endmost screw from the raceway and holding it in fixed position at one side of the raceway, and an electric circuit, which includes as parts thereof said contact member, a screw at the end of the raceway and also a solenoid-operated switch, for carrying out the cycle of the machine except upon failure of a screw to make contact with said member and to serve as part of said electric circuit.

9. A machine for assembling screws and washers, comprising means for suspending screws one-by-one by their heads in an elevated assembling position, and a washer-carrying plunger movable in a vertical path beneath a screw so suspended and a movable bridge keeper initially covering a washer on the plunger, together with means operated by movement of the plunger for displacing the keeper to uncover the washer in the movement of the plunger toward the suspended screw.

References Cited in the file of this patent

UNITED STATES PATENTS

| | | |
|---|---|---|
| 1,305,328 | Wilcox | June 3, 1919 |
| 2,086,128 | Hackbarth | July 6, 1937 |
| 2,286,250 | Albertoli | June 16, 1942 |
| 2,303,225 | Olson | Nov. 24, 1942 |
| 2,337,667 | Kuehlman | Dec. 28, 1943 |
| 2,337,696 | Van Nest | Dec. 28, 1943 |
| 2,379,564 | Cole | July 3, 1945 |
| 2,427,659 | Collyer | Sept. 23, 1947 |
| 2,613,374 | Gora | Oct. 14, 1952 |
| 2,728,091 | Hoenk | Dec. 27, 1955 |
| 2,772,426 | Bailey | Dec. 4, 1956 |
| 2,803,377 | Wilson | Aug. 20, 1957 |
| 2,832,971 | Tesch | May 6, 1958 |
| 2,878,556 | Heidergott | Mar. 24, 1959 |
| 2,910,768 | Heidergott | Nov. 3, 1959 |
| 2,931,095 | Esken | Apr. 5, 1960 |
| 2,985,900 | Nouvelet | May 30, 1961 |